US006989406B1

(12) United States Patent
Arntz et al.

(10) Patent No.: US 6,989,406 B1
(45) Date of Patent: Jan. 24, 2006

(54) POLYUREA POLYRETHANES HAVING IMPROVED PHYSICAL PROPERTIES

(75) Inventors: Hans-Detlef Arntz, Lohmar (DE); Klaus Brecht, Burscheid (DE); Bernhard John, Leverkusen (DE); Peter Seifert, Lohmar (DE); Michael Schneider, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 395 days.

(21) Appl. No.: 10/018,177

(22) PCT Filed: Jun. 2, 2000

(86) PCT No.: PCT/EP00/05036

§ 371 (c)(1),
(2), (4) Date: Dec. 12, 2001

(87) PCT Pub. No.: WO00/77064

PCT Pub. Date: Dec. 21, 2000

(30) Foreign Application Priority Data

Jun. 15, 1999 (DE) ................................. 199 27 188

(51) Int. Cl.
C08G 18/42 (2006.01)
C08G 18/48 (2006.01)
C08L 75/06 (2006.01)
C08L 18/08 (2006.01)
C08J 9/04 (2006.01)

(52) U.S. Cl. ................. 521/173; 36/25 R; 528/76; 528/77; 528/80; 528/83

(58) Field of Classification Search ............... 528/80, 528/83, 76, 77; 521/173; 36/25 R
See application file for complete search history.

(56) References Cited

U.S. PATENT DOCUMENTS

| 4,124,572 A | 11/1978 | Mao ............................ 528/76 |
| 4,945,016 A | 7/1990 | Murachi ....................... 524/81 |
| 6,521,676 B2 * | 2/2003 | Brecht et al. ................ 521/159 |

FOREIGN PATENT DOCUMENTS

| EP | 0 279 276 | 8/1988 |
| EP | 0 379 149 | 7/1990 |
| WO | 98/23659 | 6/1998 |

* cited by examiner

Primary Examiner—Rabon Sergent
(74) Attorney, Agent, or Firm—Joseph C. Gil; Lyndanne M. Whalen

(57) ABSTRACT

A process for preparing oil and petroleum-resistant cellular to solid (polyurea)polyurethanes (PURS) with improved physical properties in which a polyether polyol component having a number average molecular weight of from 1000 to 8000 and a polyester polyol component having a number average molecular weight of from 1000 to 6000 are reacted with a polyisocyanate and the (polyurea) polyurethanes produced by that process. The (polyurea)polyurethanes are particularly useful for personal safety equipment and in the construction of automobiles.

12 Claims, 1 Drawing Sheet

POLYUREA POLYRETHANES HAVING IMPROVED PHYSICAL PROPERTIES

BACKGROUND OF THE INVENTION

The invention provides a process for preparing oil and petrol-resistant cellular to solid (polyurea)polyurethanes (PURs) with improved physical properties, such as are required for personal safety equipment and for the construction of automobiles.

The wide variety of polyurethane plastics, their structure and methods of preparation has represented the prior art for many years. WO 98/23659 describes polyetherpolyurethanes which are relatively petrol-resistant. However, these swell in an obvious manner on contact with hydrocarbons and thus their mechanical and physical properties become modified. In addition, when processing polyetherpolyurethanes to produce moulded articles, the moulds become heavily soiled.

The polyester-PURs generally used hitherto in such applications have the following disadvantages:
  the high viscosity of the components when ready for processing leads to problems with the accurate reproducibility of moulded articles;
  the temperatures of 40–60° C. required for processing reduces the useful lifetime of the system components;
  inadequate resistance to hydrolysis and microbes leads to a limited operational lifetime for the products;
  the ability to control the polyaddition reaction by catalysts is restricted since these often promote glycolysis of the ester.

SUMMARY OF THE INVENTION

It has now been found that the addition of only 3 to 30 wt. %, based on total weight of polyether polyol component A1) and polyester polyol component A2), of specific polyesterpolyols to known polyetherpolyurethanes greatly improves their resistance to swelling in oil and petrol.

DETAILED DESCRIPTION OF THE INVENTION

Figure 1:
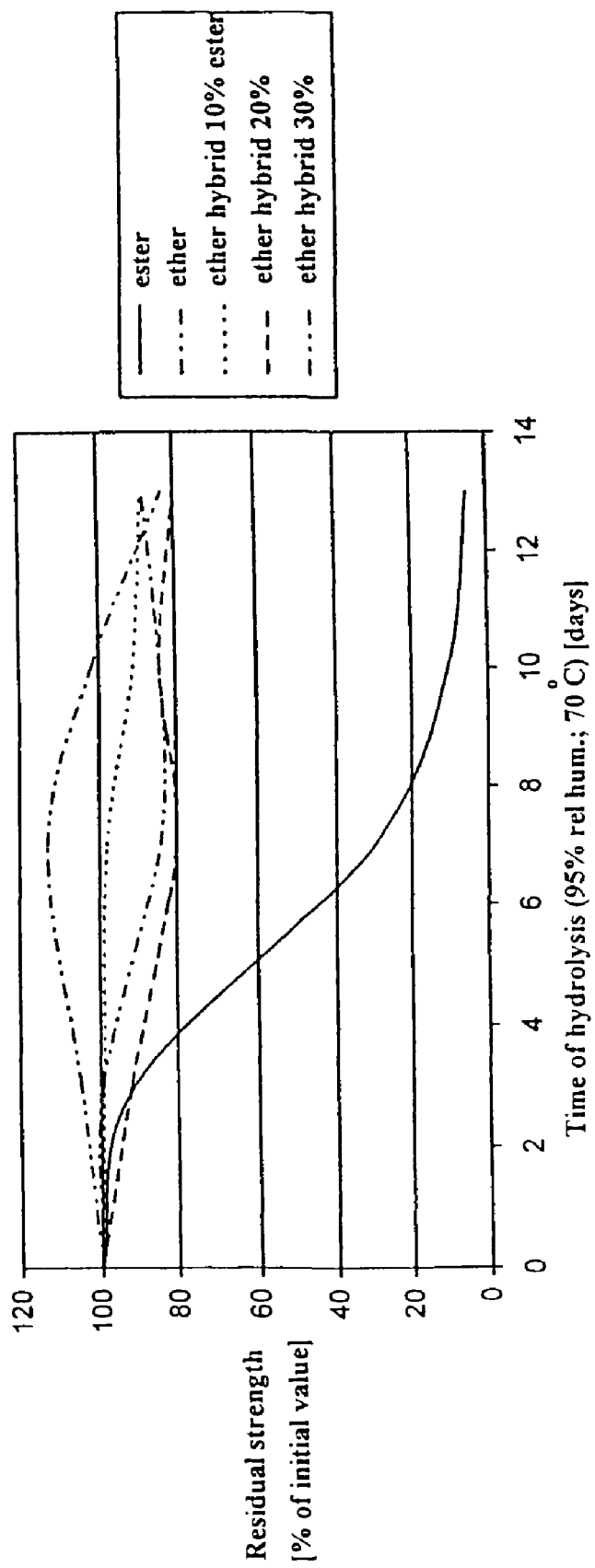
FIG. 1 is a graph of the results of the sterile hydrolysis test conducted on specimens aged at 70° C. and 95% relative humidity for a period of 7–14 days.

The invention provides oil and petrol-resistant cellular to solid (polyurea)polyurethanes, obtainable by reacting a reaction mixture comprising
  A1) a polyetherpolyol component with a number average molecular weight of 1000 to 8000 g/mol, preferably 2000 to 6000 g/mol,
  A2) a polyesterpolyol component with a number average molecular weight of 1000 to 6000 g/mol, preferably 1000 to 4000 g/mol,
  B) a polyisocyanate component,
  C) chain-extending agents,
  optionally
  D) blowing agents and
  E) activators and other auxiliary substances and additives,
wherein the starting materials are reacted while maintaining the isocyanate index at a value of 70 to 130.

Polyetherpolyol component A1) has a number average molecular weight of 1000 to 8000 g/mol and has a hydroxyl functionality of 2.0 or is substantially a mixture with an average hydroxyl functionality of 2.02 to 2.95 composed of
  a) at least one polyetherdiol with a hydroxyl value in the range 10 to 115, which has been prepared by propoxylation of a difunctional starter and subsequent ethoxylation of the propoxylation product while maintaining a ratio by weight of propylene oxide to ethylene oxide of 60:40 to 85:15 and
  b) at least one polyethertriol with a hydroxyl value in the range 12 to 56, which has been prepared by propoxylation of a trifunctional starter and subsequent ethoxylation of the propoxylation product while maintaining a ratio by weight of propylene oxide to ethylene oxide of 60:40 to 85:15 and which optionally contains fillers based on styrene/acrylonitrile copolymers, polyureas or polyhydrazocarbonamides in an amount of up to 20 wt. %, with respect to the total weight of component b).

Suitable compounds for use as component A2) are polyesterpolyols with a number average molecular weight of 1000 to 6000 g/mol, which have been prepared, for example, from organic dicarboxylic acids with 2 to 12 carbon atoms, preferably aliphatic dicarboxylic acids with 4 to 6 carbon atoms and polyhydric alcohols, preferably diols, with 2 to 12 carbon atoms, preferably 2 carbon atoms. Suitable dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used individually or in a mixture with each other. Instead of the free dicarboxylic acids, the corresponding dicarboxylic acid derivatives, such as e.g. the monoesters and/or diesters of dicarboxylic acids with alcohols with 1 to 4 carbon atoms or dicarboxylic acid anhydrides, may be used. Dicarboxylic acid mixtures of succinic, glutaric and adipic acids in the ratio of, for example, 20 to 35 parts by wt. of succinic acid to 35 to 50 parts by wt. of glutaric acid to 20 to 32 parts by wt. of adipic acid are preferably used. The use of adipic acid is particularly preferred. Examples of dihydric and polyhydric alcohols, in particular diols and alkylene glycols, are: ethanediol, diethylene glycol, 1,2- or 1,3-propanediol, dipropylene glycol, methylpropane-1,3-diol, 1,4-butanediol, 1,5-pentanediol, 1,6-hexanediol, neopentyl glycol, 1,10-decanediol, glycerol, trimethylolpropane and pentaerythritol. 1,2-ethanediol, diethylene glycol, 1,4-butanediol, 1,6-hexanediol, glycerol, trimethylolpropane or mixtures of at least two of the diols mentioned are preferred, in particular mixtures of ethanediol, diethylene glycol, 1,4-butanediol, isobutyl glycol, 1,3-propanediol, 1,2-propanediol, neopentyl glycol, 1,6-hexanediol, glycerol and/or trimethylolpropane. Furthermore, polyesterpolyols formed from lactones, e.g. ε-caprolactone, or hydroxycarboxylic acids, e.g. o-hydroxycaproic acid and hydroxyacetic acid, may also be used.

To prepare the polyesterpolyols, the organic, e.g. aromatic and preferably aliphatic polycarboxylic acids and/or derivatives of these and polyhydric alcohols are polycondensed without the use of a catalyst or in the presence of esterification catalysts, expediently in an atmosphere of inert gases, such as e.g. nitrogen, carbon monoxide, helium, argon, or also in the molten state at temperatures of 150 to 300° C., preferably 180 to 230° C., optionally under reduced pressure, until the acid value required is reached, this being advantageously less than 10 and preferably less than 1.

According to a preferred embodiment, the esterification mixture is polycondensed at the temperatures mentioned above until reaching an acid value of 80 to 30, preferably 40 to 30, under atmospheric pressure and then under a pressure of less than 500 mbar, preferably 10 to 150 mbar. Suitable esterification catalysts are, for example, iron, cadmium, cobalt, lead, zinc, antimony, magnesium, titanium and tin catalysts in the form of metal, metal oxides or metal salts. Polycondensation may also be performed in the liquid phase, however, in the presence of diluents and/or entraining agents such as e.g. benzene, toluene, xylene or chlorobenzene, for azeotropic distillation of the condensation water.

To prepare the polyesterpolyols, the organic polycarboxylic acids and/or derivatives are advantageously polycondensed with polyhydric alcohols in the ratio by moles of 1:1 to 1.8, preferably 1:1.05 to 1.2. The polyesterpolyols obtained preferably have a functionality of 2 to 3, in particular 2 to 2.6 and a number average molecular weight of 400 to 6000, preferably 800 to 3500.

Suitable polyesterpolyols are also polycarbonates which contain hydroxyl groups. Suitable polycarbonates which contain hydroxyl groups are those of a type known per se which can be prepared, for example, by reacting diols such as 1,2-propanediol, 1,4-butanediol, 1,6-hexanediol, diethylene glycol, trioxyethylene glycol and/or tetraoxyethylene glycol with diaryl carbonates, e.g. diphenyl carbonate or phosgene.

Polyesterpolyols with the following composition (compounds from which the building blocks of repeating units in the polyol are derived are cited) are particularly suitable for preparing (polyurea)polyurethanes according to the invention:

| | |
|---|---|
| adipic acid | 20–50 mol. %, preferably 40–48 mol. % |
| glutaric acid | 0–20 mol. %, preferably 0 mol. % |
| succinic acid | 0–10 mol. %, preferably 0 mol. % |
| neopentyl glycol | 10–30 mol. %, preferably 19–23 mol. % |
| hexanediol | 10–40 mol. %, preferably 30–35 mol. % |
| ethanediol | 0–15 mol. %, preferably 0–5 mol. % |
| butanediol | 10–20 mol. %, preferably 0–5 mol. % |

Polyesterpolyols with the following compositions are preferably used:
1. 47.1 mol. % adipic acid, 19.4 mol. % neopentyl glycol, 30.6 mol. % hexanediol, 2.9 mol. % butanediol;
2. 47.1 mol. % adipic acid, 19.4 mol. % neopentyl glycol, 30.6 mol. % hexanediol, 2.9 mol. % ethanediol;
3. 47.1 mol. % adipic acid, 19.4 mol. % neopentyl glycol, 30.1 mol. % hexanediol, 1.7 mol. % butanediol, 1.7 mol. % ethanediol.

Polyesterpolyols with this composition are miscible with the polyetherpolyols described under A1) over wide limits and exhibit no tendency to separate. In contrast to this, commercially available ethanediol/butane-1,4-diol/polyadipates (e.g. Bayflex® 2002H, Bayer AG) begin to separate out above a concentration of 5 wt. % in the polyetherpolyols mentioned.

As a result of adding these polyesterpolyols, the physical and mechanical properties of the PURs are affected positively without the negative properties of polyesterpolyols being detectable. The use of these esters which are compatible with polyetherpolyols enables targeted optimisation of the properties of (polyurea)polyurethanes according to the invention since polyol mixtures can be used which contain between 0 and 100% of ethers and correspondingly between 100 and 0% of esters, preferably 70 to 95 wt. % of ethers and 5 to 30 wt. % of esters. Another advantage is that transparent materials can be prepared with these types of polyol mixtures in any of these compositions.

Compounds for use as component B) are industrially readily accessible polyisocyanates such as diisocyanatodiphenylmethane, toluene diisocyanate and mixtures of these with partially carbodiimidised isocyanates in pre-extended form with an NCO content of 5 to 30 wt. %.

Polyethers or polyesters or mixtures with the structure described under components A1) and A2) which have a hydroxyl functionality of 2 to 2.5 are used for pre-extension purposes.

Compounds for use as component C) are ethanediol, diethylene glycol, butanediol, methylpropanediol, propylene glycol, triethanolamine, glycerol, diaminoethyltoluylene or mixtures of these compounds. Compounds for use as component D) are optionally water and/or a physical blowing agent, e.g. R 134a (a mixture of hydrofluoroalkanes).

Catalysts and optionally incorporated auxiliary substances and additives E) which may be used are activators such as e.g. tertiary amines, tin or titanium compounds and, depending on the requirements, surface active substances, foam stabilisers, cell regulators, internal mould release agents, colorants, pigments, anti-hydrolysis agents, substances which prevent the growth of fungi and bacteria, oxidising agents, light protection agents and antistatic agents, which are disclosed in the literature.

(Polyurea)polyurethanes according to the invention are prepared by methods known in principle by a person skilled in the art. In general, components A) and C) to E) are combined with a polyol component and reacted in a one-stage reaction with isocyanate component B), wherein conventional two-component mixing units may be used. Component A2) may be a constituent of both the polyol component and the isocyanate component.

The grades of PUR obtained are suitable in particular for preparing soles of shoes which comply with safety shoe standard EN 344, but may also be used for wheels, rollers, flexible tubing and tires due to their ability to withstand a high degree of stress.

EXAMPLES 1–6

Starting Materials

Polyhydroxyl Compounds A
  A1: Propylene oxide/ethylene oxide random block polyether started with trimethylolpropane and propylene glycol; OH value 28; functionality 2.1;
  A2a: Ethanediol/butane-1,4-diol/polyadipate; OH value 56; functionality 2;
  A2b: Polyersterpolyol containing 47.1 mol. % of units derived from adipic acid, 19.4 mol. % of units derived from neopentyl glycol, 30.6 mol. % of units derived from hexanediol and 2.9 mol. % of units derived from butanediol;

Polyisocyanate B
  B: Soft segment pre-polymer with a number average molecular weight of 4000, the reaction product of MDI with TPG and a PO/EO random block polyetherdiol, NCO value: 17 wt. %;

Chain-Extending Agent C
  Butanediol;

Catalyst E
  Mixture of diazabicyclooctane (DABCO) and dibutyltin dilaurate (DBTDL) in a ratio of about 96:4.

Method Used
  Components A1, A2 and C were mixed in accordance with the data in table 1 and reacted with isocyanates B1 or B2 in a conventional two-component mixing and metering unit by the low pressure method and introduced into an aluminium mould, the surface of which had not been treated in any way nor provided with external mould release agents. After a reaction time of 2.5 to 4 minutes, the moulded item was removed. The mechanical properties were determined 48 hours after producing test plates (200×200×10 mm³), from which conventional test specimens were prepared and measured as described in the standards (DIN 53504 S1 rod, DIN 53507 tear propagation resistance, abrasion DIN 53516; oil and petrol resistance DIN EN 344). The results are summarised in table 1.

TABLE 1

|  | Example | | | | | |
|---|---|---|---|---|---|---|
|  | 1* | 2 | 3 | 4 | 5 | 6 |
| A1 [wt. %] | 91.3 | 81.27 | 81.27 | 71.27 | 61.27 | 47.18 |
| A2a [wt. %] | — | 10.0 | — | — | — | — |
| A2b [wt. %] | — | — | 10.0 | 20.0 | 30.0 | 40.0 |
| C [wt. %] | 8.0 | 8.0 | 8.0 | 8.0 | 8.0 | 12.0 |
| E [wt. %] | 0.73 | 0.73 | 0.73 | 0.73 | 0.73 | 0.52 |
| D: water [wt. %] | — | — | — | — | — | 0.3 |
| Phase-stable | yes | no | yes | yes | yes | yes |
| B [wt. %] | 55 | 55 | 55 | 54 | 53 | 89 |
| Bulk density [kg/m³] | 950 | 950 | 950 | 950 | 950 | 600 |
| Hardness [Shore A] | 60 | 60 | 60 | 60 | 60 | 55 |
| Tensile strength [MPas] | 9.5 | 10.0 | 9.9 | 11.5 | 9.1 | 5.4 |
| Elongation at break [%] | 660 | 630 | 640 | 610 | 550 | 520 |
| Tear propagation resist. [kN/m] | 13.5 | 12.0 | 13.2 | 12.9 | 12.2 | 6.5 |
| Abrasion [mg] | 150 | 140 | 130 | 120 | 105 | 180 |
| Volume change in isooctane [%] | 11 | 10 | 9 | 6 | 3.5 | 11 |

*Comparison example, not in accordance with the invention

Whereas with conventional ester formulations, the moulds have to be cleansed weekly, when processing polyether formulations it is conventional to cleanse the moulds daily. With the new hybrid formulations, about 800 mould release operations can be performed without any detectable build-up in the moulds, which corresponds approximately to a cleansing cycle of 4 days.

In a test where articles were buried in soil under defined conditions (30° C., 95% rel. humidity, in humus soil enriched with moulds, for 8 weeks), it can be shown that addition of the ester does not impair the long-term resistance to microbial degradation. Pure esterpolyurethanes have obvious cracks in the surface of the material after four weeks under these conditions. Similar positive results were obtained in a sterile hydrolysis test in which the specimens were aged at 70° C., 95% rel. humidity for a period of 7 to 14 days (FIG. 1).

In trials with various shapes of moulds for soles, a decrease in the frequency of bubbles in the frame region of the sole was observed when pure polyether formulations were replaced by higher viscosity ether/ester formulations.

What is claimed is:

1. A process for the production of a (polyurea)polyurethane which is oil and petroleum resistant as determined in accordance with DIN EN 344 comprising reacting a mixture comprising
    A1) a polyether polyol component having a number average molecular weight of from 1000 to 8000 g/mol and a hydroxyl functionality of 2.0 or is substantially a mixture with an average hydroxyl functionality of 2.02 to 2.95 comprising
        a) at least one polyether diol with a hydroxyl value in the range of 10 to 115 prepared by propoxylation of a difunctional starter compound and subsequent ethoxylation at a ratio by weight of propylene oxide to ethylene oxide of 60:40 to 85:15 and
        b) at least one polyether triol with a hydroxyl value in the range of 12 to 56 prepared by propoxylation of a trifunctional starter compound and subsequent ethoxylation at a ratio by weight of propylene oxide to ethylene oxide of 60:40 to 85:15,
    A2) from 3 to 30 wt. %, based on total weight of components A1) and A2), of a polyester polyol component having a number average molecular weight of from 1000 to 6000 g/mol prepared by polycondensation of a) an organic polycarboxylic acid and/or a derivative thereof and b) a polyhydric alcohol,
    B) a polyisocyanate component,
    C) a chain extending agent, and optionally,
    D) a blowing agent and/or
    E) an additive
at an isocyanate index of from 70 to 130.

2. The process of claim 1 in which the polyester polyol component comprises
    (1) from 20 to 50 mol %, based on mols of polyester polyol, of units derived from adipic acid,
    (2) from 0–20 mol %, based on mols of polyester polyol, of units derived from glutaric acid,
    (3) from 0 to 10 mol %, based on mols of polyester polyol, of units derived from succinic acid,
    (4) from 10 to 30 mol %, based on mols of polyester polyol, of units derived neopentyl glycol,
    (5) from 10–40 mol %, based on mols of polyester polyol, of units derived from hexanediol,
    (6) from 0–15 mol %, based on mols of polyester polyol, of units derived from ethanediol, and
    (7) from 10–20 mol %, based on mols of polyester polyol, of units derived from butanediol,
with the sum of (1) through (7) totalling 100 mol %.

3. The process of claim 2 in which the polyester polyol component is included in the polyisocyanate component.

4. The process of claim 1 in which the polyester polyol component is included in the polyisocyanate component.

5. The process of claim 1 in which the polyether polyol component, polyester polyol component, chain extending agent, any blowing agent and any additive are combined before being reacted with the polyisocyanate component.

6. The oil and petroleum-resistant (polyurea)polyurethane produced by the process of claim 2.

7. The oil and petroleum-resistant (polyurea)polyurethane produced by the process of claim 1.

8. The (polyurea)polyurethane of claim 7 which is transparent.

9. The (polyurea)polyurethane of claim 7 which is resistant to hydrolysis and microbial action.

10. A shoe sole composed of the (polyurea)polyurethane of claim 7.

11. Safety clothing produced from the (polyurea)polyurethane of claim 7.

12. Flexible tubing produced from the (polyurea)polyurethane of claim 7.

* * * * *